(12) United States Patent
Nakamura et al.

(10) Patent No.: US 9,376,525 B2
(45) Date of Patent: Jun. 28, 2016

(54) CURABLE COMPOSITION, AND CURED SYNTHETIC RESIN USING SAME

(71) Applicant: MIE UNIVERSITY, Tsu (JP)

(72) Inventors: Shuhei Nakamura, Tsu (JP); Yoshimi Tanaka, Tsu (JP); Mikihito Kano, Tsu (JP); Kazuyo Miyata, Tsu (JP); Yasushi Murakami, Ueda (JP)

(73) Assignee: MIE UNIVERSITY, Tsui-Shi (JP)

( * ) Notice: Subject to any disclaimer, the term of this patent is extended or adjusted under 35 U.S.C. 154(b) by 0 days.

(21) Appl. No.: 14/391,251

(22) PCT Filed: Apr. 2, 2013

(86) PCT No.: PCT/JP2013/002274
§ 371 (c)(1),
(2) Date: Oct. 8, 2014

(87) PCT Pub. No.: WO2013/153773
PCT Pub. Date: Oct. 17, 2013

(65) Prior Publication Data
US 2015/0099849 A1 Apr. 9, 2015

(30) Foreign Application Priority Data
Apr. 9, 2012 (JP) ................................. 2012-088447

(51) Int. Cl.
| | |
|---|---|
| C08G 18/22 | (2006.01) |
| C08G 18/20 | (2006.01) |
| C08K 5/057 | (2006.01) |
| C08K 5/07 | (2006.01) |
| C08K 5/31 | (2006.01) |
| C08G 77/08 | (2006.01) |
| C08L 101/00 | (2006.01) |
| C08G 18/48 | (2006.01) |
| C08L 83/04 | (2006.01) |
| C08F 8/42 | (2006.01) |
| C08G 18/73 | (2006.01) |
| C08L 43/04 | (2006.01) |
| C08L 71/00 | (2006.01) |
| C09J 175/04 | (2006.01) |
| C08G 77/16 | (2006.01) |
| C08G 101/00 | (2006.01) |
| C08G 77/18 | (2006.01) |

(52) U.S. Cl.
CPC ................ *C08G 18/222* (2013.01); *C08F 8/42* (2013.01); *C08G 18/22* (2013.01); *C08G 18/48* (2013.01); *C08G 18/4825* (2013.01); *C08G 18/73* (2013.01); *C08G 77/08* (2013.01); *C08K 5/057* (2013.01); *C08K 5/07* (2013.01); *C08K 5/31* (2013.01); *C08L 43/04* (2013.01); *C08L 71/00* (2013.01); *C08L 83/04* (2013.01); *C08L 101/00* (2013.01); *C09J 175/04* (2013.01); *C08G 77/16* (2013.01); *C08G 77/18* (2013.01); *C08G 2101/00* (2013.01); *C08L 2312/08* (2013.01)

(58) Field of Classification Search
None
See application file for complete search history.

(56) References Cited

U.S. PATENT DOCUMENTS

| | | | |
|---|---|---|---|
| 4,517,352 A * | 5/1985 | White et al. .................... 528/18 |
| 2009/0182091 A1 | 7/2009 | Noro et al. | |
| 2009/0186993 A1 | 7/2009 | Noro et al. | |
| 2010/0047493 A1 | 2/2010 | Dotson | |
| 2011/0207864 A1 | 8/2011 | Nakamura et al. | |

FOREIGN PATENT DOCUMENTS

| | | | |
|---|---|---|---|
| JP | 05-039428 | A | 2/1993 |
| JP | 08-041358 | A | 2/1996 |
| JP | 10-251373 | A | 9/1998 |
| JP | 2005-247923 | A | 9/2005 |
| JP | 2005-248175 | A | 9/2005 |
| JP | 2010-525133 | A | 7/2010 |
| WO | 2007/094272 | A1 | 8/2007 |
| WO | 2007/094276 | A1 | 8/2007 |
| WO | 2008/132236 | A2 | 11/2008 |
| WO | 2010/047109 | A1 | 4/2010 |

OTHER PUBLICATIONS

European Search Report issued on Oct. 21, 2015, which is enclosed, that issued in the corresponding European Patent Application No. EP 13775529.4.

\* cited by examiner

*Primary Examiner* — Marc Zimmer
(74) *Attorney, Agent, or Firm* — Cowan, Liebowitz & Latman, P.C.; Mark Montague

(57) ABSTRACT

[Problem] To provide a curable composition having high stability and excellent curing properties. [Solution] The present invention relates to a curable composition, and a cured synthetic resin using same, that functions as a curing catalyst for a synthetic resin. The curable composition contains (A) a titanium alkoxide, (B) a bidentate organic chelating agent that stabilizes the titanium alkoxide and (C) a guanidine compound. The molar ratio of the titanium alkoxide (A), the bidentate organic chelating agent (B), and the guanidine compound (C) is 1:0.5-3:0.5-2.

4 Claims, 4 Drawing Sheets

CURABLE COMPOSITION, AND CURED SYNTHETIC RESIN USING SAME

CROSS REFERENCE

The present application claims the priority based on Japanese Patent Application No. 2012-088447 filed on Apr. 9, 2012 in Japan, and the content described in the application is herein incorporated. In addition, the contents described in patents, patent applications, and References cited in the present application are herein incorporated.

TECHNICAL FIELD

The present invention relates to a curable composition, and a cured synthetic resin using the same.

BACKGROUND ART

Conventionally, an organotin compound such as dibutyltin dilaurate, dibutyltin diacetate or dioctyltin dilaurate has been widely used as a curable composition for a synthetic resin. In recent years, such an organotin compound has been strongly demanded to be switched to a low-load compound in terms of both environment and health, and there has been proposed use of an amine compound and a carboxylic compound (see Patent Literature 1), use of a bismuth compound that is less problematic in terms of safety (see Patent Literature 2), use of a titanium alkoxide type catalyst, use of a guanidine compound as a silanol condensation catalyst (see Patent Literature 3), or the like, but none of them have yet replaced an organotin compound type curable composition currently used.

The above titanium alkoxide has been already known to have a function as a curable composition for a silicone type resin or a polyurethane resin. The titanium alkoxide provides titanium dioxide as a final decomposition product under a usual environment. Titanium dioxide is a highly safe compound to be added even to food additives and cosmetics. From such a reason, the titanium alkoxide is regarded as the most likely alternative of the curable composition for a synthetic resin.

CITATION LIST

Patent Literature

Patent Literature 1: Japanese Patent Laid-Open No. 08-41358
Patent Literature 2: Japanese Patent Laid-Open No. 05-39428
Patent Literature 3: International Publication WO 2007/094272
Patent Literature 4: Japanese Patent Laid-Open No. 2005-248175
Patent Literature 5: International Publication WO 2007/094276

SUMMARY OF INVENTION

Technical Problem

Such a titanium alkoxide type curable composition, however, has the problem of being unstable to moisture and thus easily hydrolyzed. In order to solve such a problem, the titanium alkoxide can also be coordinated with ethyl acetoacetate, a hydroxycarboxylic acid ester or the like to result in the improvements in stability and curability. The titanium alkoxide type curable composition, however, still cannot exhibit curing properties comparable with those of the organotin compound, and still is not a versatile curable composition. On the other hand, a guanidine compound, which is a strongly basic compound, is known to function as a curing agent for an organic polymer having a reactive silicon group. The guanidine compound, however, is a very unstable compound, and thus is not suitable as a curing catalyst. For example, a guanidine compound substituted with a plurality of aryl groups, such as diphenylguanidine, has been reported which is low in activity as a curing catalyst (for example, see Patent Literature 4 and Patent Literature 5).

The present invention has been made in order to solve the above problems, and an object thereof is to provide a curable composition having a high stability and excellent curing properties, and a cured synthetic resin using the same.

Solution to Problem

The present inventors have made intensive studies in order to solve the above problems, and as a result, have found that a titanium alkoxide is stabilized by a bidentate chelating agent and a guanidine compound is formulated therewith in a particular proportion to thereby provide a curable composition for a resin produced from an organic polymer having reactive silicon, such as a reactive silanol group-containing or reactive silyl group-containing polymer, a polyurethane resin or the like, the composition having curing properties comparable with or superior to those of an organotin compound currently used, leading to the completion of the present invention.

One aspect of the present invention in order to achieve the above object provides a curable composition serving as a curing catalyst for a synthetic resin, including (A) a titanium alkoxide, (B) a bidentate organic chelating agent for stabilizing the titanium alkoxide, and (C) a guanidine compound, wherein the composition includes the titanium alkoxide (A), the bidentate organic chelating agent (B) and the guanidine compound (C) in a molar ratio of 1:0.5 to 3:0.5 to 2.

Another aspect of the present invention provides the curable composition wherein the bidentate organic chelating agent (B) is at least one of ethyl acetoacetate and acetylacetone and the guanidine compound (C) is at least one of 1-phenylguanidine and 1,1,3,3-tetramethylguanidine.

One aspect of the present invention provides a synthetic resin cured by using the curable composition to produce silanol condensation of polydimethylsiloxane having a reactive silanol group.

One aspect of the present invention provides a synthetic resin cured by using the curable composition and an alkoxysilane as a crosslinking agent to produce a siloxane bond of polydimethylsiloxane having a reactive silanol group.

One aspect of the present invention provides a synthetic resin cured by using the curable composition to produce a siloxane bond of a crosslinkable silyl group-containing polymer having a polyether or an acrylic polymer as a main chain.

One aspect of the present invention provides a synthetic resin cured by using the curable composition to produce a urethane bond due to a reaction of a polyol and a polyisocyanate.

Advantageous Effect of Invention

The present invention can provide a curable composition having a high stability and excellent curing properties, and a cured synthetic resin using the same.

DESCRIPTION OF EMBODIMENTS

Figure 1:
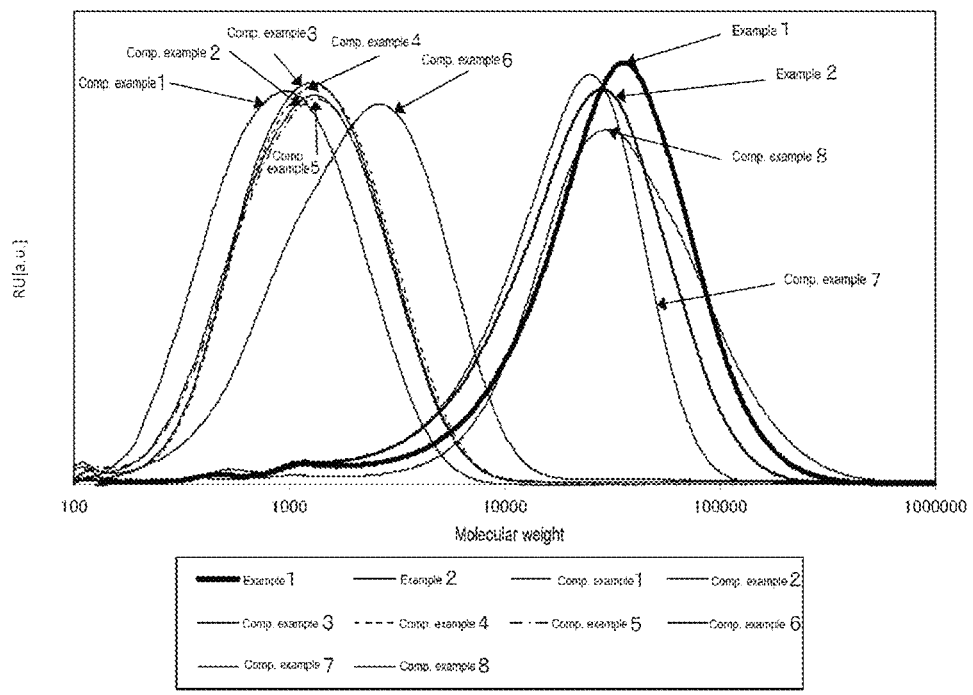
FIG. 1 shows the molecular weight distribution measurement result of a product of each of samples in Examples 1 and 2 and Comparative Examples 1 to 8.

Hereinafter, the respective embodiments of the curable composition of the present invention and the cured synthetic resin using the same are described.

<1. Curable Composition>

A curable composition of this embodiment serves as a curing catalyst for a synthetic resin, and includes
(A) a titanium alkoxide,
(B) a bidentate organic chelating agent for stabilizing the titanium alkoxide, and
(C) a guanidine compound,
wherein the composition includes the titanium alkoxide (A), the bidentate organic chelating agent (B) and the guanidine compound (C) in a molar ratio of 1:0.5 to 3:0.5 to 2. Hereinafter, (A), (B) and (C) are described in detail.

(1) Main Components of Curable Composition (A) Titanium Alkoxide

Suitable examples of the titanium alkoxide as one component in the curable composition of this embodiment can include titanium tetramethoxide, titanium tetraethoxide, titanium tetraallyloxide, titanium tetra-n-propoxide, titanium tetraisopropoxide, titanium tetra-n-butoxide, titanium tetraisobutoxide, titanium tetra-sec-butoxide, titanium tetra-t-butoxide, titanium tetra-n-pentyloxide, titanium tetracyclopentyloxide, titanium tetrahexyloxide, titanium tetracyclohexyloxide, titanium tetrabenzyloxide, titanium tetraoctyloxide, titanium tetrakis(2-ethylhexyloxide), titanium tetradecyloxide, titanium tetradodecyloxide, titanium tetrastearyloxide, a titanium tetrabutoxide dimer, titanium tetrakis(8-hydroxyoctyloxide), titanium diisopropoxide bis(2-ethyl-1,3-hexanediolate), titanium bis(2-ethylhexyloxy)bis(2-ethyl-1,3-hexanediolate), titanium tetrakis(2-chloroethoxide), titanium tetrakis(2-bromoethoxide), titanium tetrakis(2-methoxyethoxide), titanium tetrakis(2-ethoxyethoxide), titanium butoxidetrimethoxide, titanium dibutoxidedimethoxide, titanium butoxidetriethoxide, titanium dibutoxidediethoxide, titanium butoxidetriisopropoxide, titanium dibutoxidediisopropoxide, titanium tetraphenoxide, titanium tetrakis(o-chlorophenoxide), titanium tetrakis(m-nitrophenoxide), titanium tetrakis(p-methylphenoxide) and titanium tetrakis(trimethylsilyloxide).

These titanium alkoxides may be used singly or in combinations of a plurality thereof. Among them, a titanium alkoxide including an alkoxide group having 1 to 12 carbon atoms is more preferable, and a titanium alkoxide including an alkoxide group having 1 to 6 carbon atoms is further preferable. Oligomers thereof can also be used. More preferable examples of the titanium alkoxide are titanium tetraethoxide, titanium tetra-ortho-ethoxide, titanium tetraisopropoxide and titanium tetrabutoxide. From the viewpoints of handleability, availability and curability, titanium tetraethoxide, titanium tetraisopropoxide, titanium tetra-n-butoxide and titanium tetra-t-butoxide are preferable. In addition, an alkoxide of a metal other than titanium, such as an aluminum or zirconium alkoxide, may also be used in combination in addition to the titanium alkoxide as long as it does not impair the effect of the titanium alkoxide.

(B) Bidentate Organic Chelating Agent

As the bidentate organic chelating agent (simply referred to as "chelating agent") for stabilizing the titanium alkoxide, an active methylene compound represented by general formula: R(CO)—CH$_2$—X (R; alkyl group, aryl group or benzyl group, X; electron withdrawing group) can be suitably used. Examples of the active methylene compound can include acetylacetone, malonic acid diester, acetoacetic acid ester, cyanoacetic acid ester and Meldrum's acid. Examples of the malonic acid diester can include dimethyl malonate, diethyl malonate, diisopropyl malonate, di-n-propyl malonate, di-n-butyl malonate, di(2-ethylhexyl) malonate, ethyl n-butyl malonate, methyl n-butyl malonate, ethyl t-butyl malonate, methyl t-butyl malonate, methyl diethyl malonate, dibenzyl malonate, diphenyl malonate, benzyl methyl malonate, ethyl phenyl malonate, t-butyl phenyl malonate and isopropylidene malonate. In addition, examples of the acetoacetic acid ester can include methyl acetoacetate, ethyl acetoacetate, isopropyl acetoacetate, n-propyl acetoacetate, t-butyl acetoacetate, n-butyl acetoacetate, benzyl acetoacetate and phenyl acetoacetate. Examples of the cyanoacetic acid ester can include methyl cyanoacetate, ethyl cyanoacetate, n-propyl cyanoacetate, i-propyl cyanoacetate, n-butyl cyanoacetate, i-butyl cyanoacetate, t-butyl cyanoacetate, benzyl cyanoacetate, methyl diphenylcyanoacetate, ethyl diphenylcyanoacetate, methyl 2-methylphenylcyanoacetate and ethyl 2-methylphenylcyanoacetate. Among these active methylene compounds, ethyl acetoacetate and acetylacetone are particularly preferable.

(C) Guanidine Compound

The guanidine compound is represented by general formula: $R^1N=C(NR^1{}_2)_2$ (wherein any one of five $R^1$ represents an organic group, and the remaining four $R^1$ each independently represent a hydrogen atom, a saturated hydrocarbon group, —C(=NR$^2$)—NR$^2{}_2$ (wherein three R$^2$ each independently represent a hydrogen atom or an organic group) or =C(—NR$^2{}_2)_2$ (wherein four R$^2$ each independently represent a hydrogen atom or an organic group)).

Examples of the guanidine compound can include guanidine compounds such as 1,1,2-trimethylguanidine, 1,2,3-trimethylguanidine, 1,1,3,3-tetramethylguanidine, 1,1,2,2,3-pentamethylguanidine, 2-ethyl-1,1,3,3-tetramethylguanidine, 1-benzylguanidine, 1,3-dibenzylguanidine, 1-benzyl-2,3-dimethylguanidine, 1-phenylguanidine, 1-(o-tolyl)guanidine, 1-(3-methylphenyl)guanidine, 1-(4-methylphenyl)guanidine, 1-(2-chlorophenyl)guanidine, 1-(4-chlorophenyl)guanidine, 1-(2,3-xylyl)guanidine, 1-(2,6-xylyl)guanidine, 1-(1-naphthyl)guanidine, 2-phenyl-1,3-dicyclohexylguanidine, 1-phenyl-1-methylguanidine, 1-(4-chlorophenyl)-3-(1-methylethyl)guanidine, 1-(4-methylphenyl)-3-octylguanidine, 1-(4-methoxyphenyl)guanidine, 1,1'-[4-(dodecyloxy)-m-phenylene]bisguanidine, 1-(4-nitrophenyl)guanidine, 4-guanidinobenzoic acid, 2-(phenylimino)imidazolidine, 2-(5,6,7,8-tetrahydronaphthale-1-ylamino)-2-imidazoline, N-(2-imidazolin-2-yl)-2,3-xylidine, N-(2-imidazolin-2-yl)-1-naphthalenamine, 1,1'-[methylenebis(p-phenylene)]bisguanidine, 1,5,7-triazabicyclo[4.4.0]-5-decene, 7-methyl-1,5,7-triazabicyclo[4.4.0]-5-decene, 7-n-propyl-1,5,7-triazabicyclo[4.4.0]-5-decene, 7-isopropyl-1,5,7-triazabicyclo[4.4.0]-5-decene, 7-n-butyl-1,5,7-triazabicyclo[4.4.0]-5-decene, 7-n-cyclohexyl-1,5,7-triazabicyclo[4.4.0]-5-decene and 2,3,5,6-tetrahydro-3-phenyl-1H-imidazo[1,2-a]imidazole; and biguanide compounds such as 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-phenylbiguanide, 1-(o-tolyl)biguanide, 1-(3-methylphenyl)biguanide, 1-(4-methylphenyl)biguanide, 1-(2-chlorophenyl)biguanide, 1-(4-chlorophenyl)biguanide, 1-(2, 3-xylyl)biguanide, 1-(2,6-xylyl)biguanide, 1-(1-naphthyl) biguanide, 1,3-diphenylbiguanide, 1,5-diphenylbiguanide, 1-phenyl-1-methylbiguanide, 1-(4-chlorophenyl)-5-(1-methylethyl)biguanide, 1-(4-methylphenyl)-5-octylbiguanide, 1-(4-methoxyphenyl)biguanide, 1-(3,4-dichlorophenyl)-5-(1-methylethyl)biguanide, 1,1'-hexamethylene-bis[5-(4-chlorophenyl)biguanide], 2-guanidino-1H-benzimidazole, 1-(4-nitrophenyl)biguanide, 1-benzylbiguanide, 1-(2-phenylethyl)biguanide, 3-(2-phenylethyl)biguanide, N,N-diamidinoaniline, 1,5-ethylenebiguanide, 1-morpholinobiguanide, 3-morpholinobiguanide, 1-(4-chlorobenzyloxy)biguanide, 1-n-butyl-N2-ethylbiguanide, 1,1'-ethylenebisbiguanide, 1-[3-(diethylamino)propyl]biguanide, 1-[3-(dibutylamino) propyl]biguanide, N',N''-dihexyl-3,12-diimino-2,4,11,13-tetraazatetradecanediamidine, 4-[3-(amidino)guanidino] benzenesulfonic acid, 1,2-diisopropyl-3-[bis (dimethylamino)methylene]guanidine and 5-[3-(2,4,5-trichlorophenoxyl)propoxy]-1-isopropylbiguanide. Among these guanidine compounds, 1,1,3,3-tetramethylguanidine and 1-phenylguanidine are particularly preferable.

(2) Ratio of Main Components in Curable Composition

The curable composition of this embodiment suitably includes the titanium alkoxide (A), the chelating agent (B) and the guanidine compound (C) in a molar ratio of 1:0.5 to 3:0.5 to 2, further suitably in a molar ratio of 1:1.5 to 2.5:0.75 to 2.0. While the chelating agent (B) can be included in an amount of 0.5 mol or more (more preferably 1.5 mol or more) based on 1 mol of the titanium alkoxide (A) to thereby improve stabilization of the titanium alkoxide (A), the chelating agent (B) can be included in an amount of 3 mol or less (more preferably 2.5 mol or less) based on 1 mol of the titanium alkoxide (A) to thereby allow excess of the chelating agent (B) to hardly remain, and adhesion properties and curing properties can be sufficiently exhibited. The guanidine compound (C) can be included in an amount of 0.5 mol or more (more preferably 0.75 mol or more) and 2 mol or less based on 1 mol of the titanium alkoxide (A), thereby effectively exerting a function as a curing aid. Herein, the term "curing properties" means at least any one of a high rate of increase in molecular weight (leading to a high increase speed of viscosity), a high breaking strength after curing, a high elongation at breaking after curing and a high hot water resistance after curing.

The curable composition of this embodiment includes one in which a part or all of the titanium alkoxide (A) and the chelating agent (B) among the titanium alkoxide (A), the chelating agent (B) and the guanidine compound (C) form a chelate, and one in which the titanium alkoxide (A), the chelating agent (B) and the guanidine compound (C) are simply mixed. That is, the titanium alkoxide (A) and the chelating agent (B) may not necessarily form a chelate. The curable composition may include a remaining solvent derived from a raw material, and a solvent to be added for the purpose of e.g., adjusting an amount added and preventing a catalyst from being solidified, such as alcohols and hydrocarbon type solvents, as well as a filler or the like, as long as curability is not inhibited. In addition, the curable composition, if a resin to be mixed therewith includes a plurality of components, may be partially included in one of such resin components and may be residually included in the other of such resin components. In such a case, as soon as the resin components are mixed, the curable composition is instantaneously present in the resulting mixture. As a curable composition for curing a resin including as a main agent a polyorganosiloxane having a reactive silanol group, a resin including as a main agent a crosslinkable silyl group-containing polymer having an acrylic polymer as a main chain, or a polyurethane resin synthesized by a reaction of a polyol and a polyisocyanate, a combination of the titanium alkoxide, ethyl acetoacetate and 1,1,3,3-tetramethylguanidine is preferable, and a type in which titanium tetraisopropoxide is used as the titanium alkoxide (TTiP-EAcAc-TMG type) is particularly preferable. In addition, as a curable composition for curing a resin including as a main agent a crosslinkable silyl group-containing polymer having a polyether as a main chain, a combination of the titanium alkoxide, ethyl acetoacetate and 1-phenylguanidine is preferable, and a type in which titanium tetraisopropoxide is used as the titanium alkoxide (TTiP-EAcAc-PhG type) is particularly preferable.

<2. Synthetic Resin>

(1) Resin Including, as Main Agent, Polyorganosiloxane Having Reactive Silanol Group The resin including as a main agent a polyorganosiloxane having a reactive silanol group is roughly classified to a resin that produces a siloxane bond due to a reaction of a silanol in a polyorganosiloxane, for curing, and a resin that produces a siloxane bond of a polyorganosiloxane having a reactive silanol group by means of a compound having a reactive silicon group as a crosslinking agent, for curing. Both the resins include as an essential main agent (a) a terminal silanol-modified polyorganosiloxane, and the latter resin is required to additionally include as a crosslinking agent (b) an alkoxysilane. Hereinafter, (a) a terminal silanol-modified polyorganosiloxane, (b) an alkoxysilane and (c) a curable composition are separately described in detail, which serve as components of the resin including as a main agent a polyorganosiloxane having a reactive silanol group.

(a) Terminal Silanol-Modified Polyorganosiloxane

A suitable example of the terminal silanol-modified polyorganosiloxane is represented by the following general formula ("Formula 1"). Herein, not only a polyorganosiloxane in which both terminals are modified by silanol but also a polyorganosiloxane in which only one terminal is modified by silanol may be adopted. In formula ("Formula 1"), n>1 is satisfied, and $R^1$ and $R^2$ each independently represent a linear or branched alkyl group having 1 to 20 carbon atoms, a cycloalkyl group having 4 to 10 carbon atoms, or an aryl group or aryl-substituted hydrocarbon group having 6 to 10 carbon atoms. Suitable examples of the linear or branched alkyl group having 1 to 20 carbon atoms can include various functional groups such as methyl, ethyl, n-propyl, propyl, n-butyl, i-butyl, s-butyl, t-butyl, pentyl, neopentyl, hexyl, heptyl, octyl, nonyl, decyl, undecyl and dodecyl. In addition, suitable examples of the cycloalkyl group having 4 to 10 carbon atoms can include various functional groups such as cyclopentyl and cyclohexyl. Furthermore, suitable examples of the aryl group or aryl-substituted hydrocarbon group having 6 to 10 carbon atoms can include various functional groups such as phenyl, toluyl, xylyl, ethylphenyl, benzyl and phenethyl. The terminal silanol-modified polyorganosiloxane is particularly preferably a both-terminal silanol-modified polydimethylsiloxane.

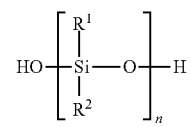

[Formula 1]

The viscosity of the terminal silanol-modified polyorganosiloxane at 23° C. is 10 to 100,000 mPa·s, preferably 20 to 50,000 mPa·s and further preferably 30 to 10,000 mPa·s.

(b) Alkoxysilane

Examples of the alkoxysilane can include tetraalkoxysilanes such as tetramethoxysilane, tetraethoxysilane, tetrapropoxysilane, tetraisopropoxysilane and tetrabutoxysilane; trialkoxysilanes such as methyltrimethoxysilane, methyltriethoxysilane, methyltripropoxysilane, ethyltrimethoxysilane, ethyltriethoxysilane, ethyltripropoxysilane, methyltributoxysilane, n-propyltrimethoxysilane, n-propyltriethoxysilane, n-propyltripropoxysilane, isopropyltrimethoxysilane, isopropyltriethoxysilane, n-butyltrimethoxysilane, n-butyltriethoxysilane, isobutyltrimethoxysilane, isobutyltriethoxysilane, hexyltrimethoxysilane, hexyltriethoxysilane, hexyltripropoxysilane, octyltrimethoxysilane, octyltriethoxysilane, octyltripropoxysilane, decyltrimethoxysilane, dodecyltrimethoxysilane, tetradecyltrimethoxysilane, tetradecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, benzyltrimethoxysilane, benzyltriethoxysilane, vinyltrimethoxysilane, vinyltriethoxysilane, 3-glycidoxypropyltrimethoxysilane, 3-glycidoxypropyltriethoxysilane, 3-mercaptopropyltrimethoxysilane, 3-mercaptopropyltriethoxysilane, 3,4-epoxycyclohexylethyltrimethoxysilane, 3,4-epoxycyclohexylethyltrimethoxysilane and 3-aminopropyltrimethoxysilane; and dialkoxysilanes such as dimethyldimethoxysilane, dimethyldiethoxysilane, dimethyldipropoxysilane, diethyldimethoxysilane, diethyldiethoxysilane, diethyldipropoxysilane, diphenyldimethoxysilane and diphenyldiethoxysilane.

Among alkoxysilanes listed above, tetraalkoxysilanes and trialkoxysilanes are preferable, furthermore, tetramethoxysilane, methyltrimethoxysilane and phenyl trimethoxysilane are more preferable, and in particular, methyltrimethoxysilane is more preferable. The amount of the alkoxysilane added is preferably in a range from 0.6 to 20 mol based on 1 mol of the polyorganosiloxane.

(c) Curable Composition

The curable composition including the titanium alkoxide (A), the chelating agent (B) and the guanidine compound (C) is preferably added in a range from 0.1 to 10% by mass based on the total mass of the resin including the curable composition. The curable composition may be mixed with the terminal silanol-modified polyorganosiloxane or with a mixture of the terminal silanol-modified polyorganosiloxane and the alkoxysilane by any method.

(2) Resin Including, as Main Agent, Crosslinkable Silyl Group-Containing Polymer Having Polyether, Acrylic Polymer or the Like as Main Chain Hereinafter, (a) a crosslinkable silyl group-containing polymer having a polyether, an acrylic polymer or the like as a main chain, and (b) a curable composition are separately described in detail, which serve as components of the resin including as a main agent a crosslinkable silyl group-containing polymer having a polyether, an acrylic polymer or the like as a main chain.

(a) Crosslinkable Silyl Group-Containing Polymer Having Polyether, Acrylic Polymer or the Like as Main Chain The polyether that can serve as a main chain is a polymer including a repeating unit represented by general formula: —O—R (R: organic group such as alkyl group, cycloalkyl group, or aryl group or aryl-substituted hydrocarbon), wherein R can be exemplified as in $R^1$ in "Formula 1". The acrylic polymer that can serve as a main chain is a polymer obtained by polymerizing one or more of acrylic monomers such as (meth)acrylic acid, (meth)acrylic acid ester, (meth)acrylonitrile and (meth)acrylamide. As the acrylic monomer, (meth)acrylic acid ester is preferable. The (meth)acrylic acid ester includes alkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, s-butyl (meth)acrylate, t-butyl (meth)acrylate, n-pentyl (meth)acrylate, neopentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, isodecyl (meth)acrylate, dodecyl (meth)acrylate, lauryl (meth)acrylate, tridecyl (meth)acrylate and stearyl (meth)acrylate; alicyclic alkyl acrylates such as cyclohexyl (meth)acrylate, isobornyl (meth) acrylate and tricyclodecynyl (meth)acrylate; aromatic acrylic acid esters such as phenyl (meth)acrylate, toluyl (meth)acrylate and benzyl (meth)acrylate; hydroxyalkyl (meth)acrylates such as hydroxyethyl (meth)acrylate, hydroxybutyl (meth) acrylate, hydroxypropyl (meth)acrylate and an ε-caprolactone adduct reactant of hydroxyethyl (meth)acrylate; and hetero atom-containing acrylic acid esters such as 2-methoxyethyl (meth)acrylate, 3-methoxybutyl (meth)acrylate, 2-aminoethyl (meth)acrylate, dimethylaminoethyl (meth)acrylate, chloroethyl (meth)acrylate, trifluoroethyl (meth)acrylate, trifluoromethylmethyl (meth)acrylate and tetrahydrofurfuryl (meth)acrylate. The crosslinkable silyl group is a group that has a silicon atom and a hydroxyl group and/or hydrolyzable functional group bound thereto, and that can form a siloxane bond by means of a curable composition and also form a crosslinking structure. The crosslinkable silyl group is a group represented by general formula: $Si(R^1)_n X_{3-n}$ (wherein each $R^1$ independently represents a hydrocarbon group, each X independently represents a reactive group selected from a halogen atom, a hydrogen atom, a hydroxyl group, an alkoxy group, an acyloxy group, a ketoxymate group, an amide group, an acid amide group, a mercapto group, an alkenyloxy group and an aminooxy group, and n denotes an integer of 0 to 2.). In the general formula, $R^1$ preferably represents an alkyl group having 1 to 20 carbon atoms, an aryl group having 6 to 10 carbon atoms or an aralkyl group having 7 to 20 carbon atoms. When n=2 is satisfied, a plurality of $R^1$ may be the same or different from each other. In addition, when n=0 or 1 is satisfied, a plurality of X may be the same or different from each other. X in the general formula preferably represents an alkoxy group. As the crosslinkable silyl group-containing polymer having a polyether as a main chain, in particular, a methyldimethoxysilyl group-containing oxyalkylene polymer is preferably used. As the crosslinkable silyl group-containing polymer having an acrylic polymer as a main chain, in particular, an alkoxysilyl group-containing acrylic polymer is preferably used.

(b) Curable Composition

The curable composition including the titanium alkoxide (A), the chelating agent (B) and the guanidine compound (C) is preferably added in a range from 0.1 to 10% by mass based on the total mass of the resin including the curable composition. The curable composition may be mixed with the crosslinkable silyl group-containing polymer having a polyether, an acrylic polymer or the like as a main chain by any method.

(3) Polyurethane Resin Synthesized by Reaction of Polyol and Polyisocyanate

Hereinafter, (a) a polyol, (b) a polyisocyanate and (c) a curable composition are separately described in detail, which serve as components of the polyurethane resin synthesized by a reaction of a polyol and a polyisocyanate.

(a) Polyol

As the polyol, a diol containing two hydroxyl groups, or a polyol containing three or more hydroxyl groups can be used without particular limitation. For example, a polyol such as a polyether type, polyester type, polycarbonate type, acrylic, polybutadiene type or polyolefin type polyol, or a polyol such as a caprolactone-modified polyol, a polyester amide polyol, a polyurethane polyol, an epoxy polyol, an epoxy-modified polyol, an alkyd-modified polyol, castor oil or a fluorine-containing polyol may be used singly or in combination. The polyol is preferably one having an average molecular weight in a range from 200 to 10000. When the average molecular weight of the polyol is 200 or more, flexibility of a cured body can be improved. When the average molecular weight of the polyol is 10000 or less, hardness of a cured body can be increased.

Herein, specific examples of the polyether type polyol include a polyol obtained by adding an alkylene oxide typified by ethylene oxide, propylene oxide, butylene oxide or polyoxytetramethylene oxide to a compound having at least two or more active hydrogen groups serving as a starting material, for example, polyhydric alcohols such as ethylene glycol, propylene glycol, butylene glycol, tetramethylene glycol, glycerin, trimethylolpropane, pentaerythritol, sorbitol and sucrose, aliphatic amine compounds such as ethylene diamine, aromatic amine compounds such as toluenediamine and diphenylmethane-4,4-diamine, and alkanolamines such as ethanolamine and diethanolamine.

Specific examples of the polyester type polyol include a condensation polymer of at least one selected from ethylene glycol, propylene glycol, butanediol, pentanediol, hexanediol, glycerin, 1,1,1-trimethylolpropane, other low-molecular weight polyol and the like, and at least one selected from glutaric acid, adipic acid, pimelic acid, suberic acid, sebacic acid, dimer acid and other low-molecular weight aliphatic carboxylic acid and oligomer acid and the like; and a ring-opened polymer of propiolactone, valerolactone or the like.

Examples of other polyol include a polymer type polyol and a polycarbonate type polyol; a polybutadiene type polyol; a hydrogenated polybutadiene type polyol; an acrylic polyol; and low-molecular weight polyols such as ethylene glycol, diethylene glycol, propylene glycol, dipropylene glycol, butanediol, pentanediol and hexanediol.

(b) Polyisocyanate

As the polyisocyanate, a known compound capable of synthesizing a polyurethane can be used. In particular, a polyisocyanate that is good in compatibility with the polyol and that can be cured at ordinary temperature is suitably used. In addition, any polyisocyanate can be suitably used as long as it has two or more NCO groups in its molecule. Examples thereof include aromatic polyisocyanates such as TDI (e.g., 2,4-tolylenediisocyanate (2,4-TDI) and 2,6-tolylenediisocyanate (2,6-TDI)), MDI (e.g., 4,4'-diphenylmethane diisocyanate (4,4'-MDI), 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI) and triphenylmethane triisocyanate; aliphatic polyisocyanates such as hexamethylene diisocyanate (HDI), trimethyl hexamethylene diisocyanate (TMHDI), lysine diisocyanate and norbornane diisocyanatomethyl (NBDI); alicyclic polyisocyanates such as trans-cyclohexane-1,4-diisocyanate, isophorone diisocyanate (IPDI), bis(isocyanatomethyl)cyclohexane ($H_6$XDI) and dicyclohexylmethane diisocyanate ($H_{12}$MDI); and a carbodiimide-modified polyisocyanate or isocyanurate-modified polyisocyanate of each of the above polyisocyanates. These may be used singly or in combinations of two or more.

Among them, XDI, TDI, MDI, TMHDI, NDI, $H_6$XDI, $H_{12}$MDI, TMXDI, HDI, IPDI and NBDI are suitably used as the polyisocyanate because of being easily available. In particular, XDI, TDI, MDI, TMXDI and HDI are more preferable because of being relatively inexpensive. In addition, XDI, TDI and MDI are preferable because of being high in reactivity. In this embodiment, various polyisocyanates suitably listed from such reasons may be used singly or in combinations of two or more.

The amounts of the polyol and the polyisocyanate constituting the resin, formulated, are not particularly limited, but the isocyanate index (isocyanate index: [number of (—OH) groups in polyol]/[number of isocyanate groups (—NCO) in polyisocyanate]) is usually in a range from 0.5 to 2.5. When a cured body is obtained, the isocyanate index is further preferably in a range from 0.7 to 1.5, but not particularly limited thereto. When the isocyanate index is 0.7 or more in this case, crosslinking density is increased and resin strength is increased. When the isocyanate index is 1.5 or less, the unreacted isocyanate group hardly remains and thus physical properties of a cured body are hardly changed.

(c) Curable Composition

The curable composition including the titanium alkoxide (A), the chelating agent (B) and the guanidine compound (C) is preferably added in a range from 0.001 to 3% by mass based on the total amount of the polyol and the polyisocyanate. The curable composition may be mixed with a mixture of the polyol and the polyisocyanate, only the polyol, or the polyisocyanate by any method. One or two of the titanium alkoxide (A), the chelating agent (B) and the guanidine compound (C) in the curable composition may be mixed with the polyol and the remaining may be mixed with the polyisocyanate in advance.

Various resins (1) to (3) above may include any components other than the above respective components, for example, a solvent, a filler and a disperser. Various resins above can be used in a resin molded product, a coating film, a paint, an adhesive, a sealing material, and the like for electric and electronic products, members for vehicles, ships and airplanes, and members for civil engineering and construction, and the above curable composition can be suitably used as a curing catalyst for various resins above.

EXAMPLES

Then, Examples of the present invention are described. The present invention, however, is not limited to the following Examples.

1. Compound Used in Curable Composition (1) Titanium Alkoxide

As the titanium alkoxide, titanium tetraisopropoxide (produced by Kanto Chemical Co., Inc., hereinafter, abbreviated as "TTiP") was used.

(2) Chelating Agent

As the chelating agent, ethyl acetoacetate (produced by Kanto Chemical Co., Inc., hereinafter, abbreviated as "EAcAc"), acetylacetone (produced by Kanto Chemical Co., Inc., hereinafter, abbreviated as "AcAc") and dimethyl malonate (produced by Tokyo Chemical Industry Co., Ltd., hereinafter, abbreviated as "DM") were used.

(3) Guanidine Compound

As the guanidine compound, 1,1,3,3-tetramethylguanidine (produced by Tokyo Chemical Industry Co., Ltd., hereinafter, abbreviated as "TMG") and 1-phenylguanidine (produced by Nippon Carbide Industries Co., Inc., hereinafter, abbreviated as "PhG") were used.

2. Organic Polymer Having Reactive Silicon Group

As the organic polymer having a reactive silicon group, a both-terminal silanol-modified polydimethylsiloxane (produced by Shin-Etsu Chemical Co., Ltd., product number: X-21-5841, Mw=1000, hereinafter, abbreviated as "PDMS") and an alkoxysilyl group-containing acrylic polymer (produced by Toagosei Co., Ltd., product number: ARUFON US-6170, Mw=2900, number of Si groups: 0.5/MN, hereinafter, abbreviated as "US-6170") were used. Furthermore, as the organic polymer having a reactive silicon group, a silyl-terminated polyether (produced by Kaneka Corporation, product number: 5303, hereinafter, abbreviated as "S303") was also used.

3. Crosslinking Agent

As the crosslinking agent, methyltrimethoxysilane (produced by Shin-Etsu Chemical Co., Ltd., hereinafter, abbreviated as "MTMS") was used.

4. Polyurethane Raw Materials

As the polyurethane raw materials, a polyol formulation (produced by Urethane Giken Industry Co., Ltd., hereinafter, abbreviated as "PPG") including as a main component a polypropylene type polyol of a two-component mixing type, tacky, non-yellowing and low-hardness polyurethane (product name: Seftac A30-NY), and an isocyanate formulation (produced by Urethane Giken Industry Co., Ltd., hereinafter, abbreviated as "DIC") including as a main component an aliphatic type diisocyanate of the same polyurethane were used.

5. Comparative Curing Agent and Raw Material of Comparative Curing Agent

As the comparative curing agent, dibutyltin dilaurate (produced by Tokyo Chemical Industry Co., Ltd., hereinafter, abbreviated as "DBTDL") and titanium diisopropoxide bis (ethyl acetoacetate) (produced by Matsumoto Fine Chemical Co., Ltd., product name: Orgatix TC-750, hereinafter, abbreviated as "TC-750") were used. Furthermore, as one raw material constituting the comparative curing agent, 3-aminopropyltrimethoxysilane (produced by Tokyo Chemical Industry Co., Ltd., hereinafter, abbreviated as "aminosilane") was also used.

6. Preparation of Curable Composition

(1) Preparation Example 1 (TTiP-EAcAc-TMG Type)

0.142 g of TTiP and 0.13 g of EAcAc were weighed and placed in a screw tube bottle having a volume of 13.5 cc, the bottle was sealed, and the content of the bottle was mixed using a magnetic stirrer for 30 minutes. Thereafter, 0.0576 g of TMG was further added thereto and the resultant was stirred for 30 minutes to provide curable composition 1. Such a sequence of operations was performed in a glove box in which a dry nitrogen gas was purged. The composition of curable composition 1 was in a molar ratio of TTiP:EAcAc:TMG=1:2:1.

(2) Preparation Example 2 (TTiP-AcAc-TMG Type)

Curable composition 2 was prepared in the same procedure as in Preparation Example 1 except that 0.10 g of AcAc was used instead of 0.13 g of EAcAc in Preparation Example 1. The composition of curable composition 2 was in a molar ratio of TTiP:AcAc:TMG=1:2:1.

(3) Preparation Example 3 (TTiP-EAcAc-PhG Type)

Curable composition 3 was prepared in the same procedure as in Preparation Example 1 except that 0.135 g of PhG was used instead of 0.0576 g of TMG in Preparation Example 1. The composition of curable composition 3 was in a molar ratio of TTiP:EAcAc:PhG=1:2:2.

7. Evaluation of Various Curing Properties

(1) Curing Test by Production of Siloxane Bond of PDMS

Example 1

The screw tube bottle accommodating curable composition 1 prepared in the above procedure was charged with 10 g of PDMS, and the content thereof was stirred by a magnetic stirrer using a stirring bar for 2 hours with heating so that the temperature of the solution in the tube was 60° C. After completion of the stirring, a sample in the screw tube bottle was left to stand for 1 hour until the temperature reached room temperature. After cooling to room temperature, the resultant was spread on a tetrafluoroethylene petri dish having an inner diameter of 96 mm and a depth of 12 mm, and left to stand under an environment of room temperature, 23±2° C., and a relative humidity of 50%, and the molecular weight distribution was measured after one week. The molecular weight distribution was measured by gel permeation chromatography (GPC). GPC measurement was performed using HLC-8220GPC (manufactured by Tosoh Corporation) as a measuring instrument, TSK-GEL SUPER HZM-M (manufactured by Tosoh Corporation) as a column, polystyrene (Polymer Laboratories Ltd.) as a standard substance, and toluene (produced by Wako Pure Chemical Industries, Ltd.) as a solvent. Fifteen mg of the sample was dissolved in 1 cc of toluene in a glass screw tube bottle having a volume of 4 cc, thereafter the resultant was transferred to a GPC sample cup having a volume of 2 cc, and GPC measurement was performed. GPC measurement conditions after that were the same as above.

Example 2

A sample was prepared under the same conditions as in Example 1 except that curable composition 1 was replaced by curable composition 2, and curing properties thereof were evaluated.

Comparative Example 1

A sample was prepared under the same conditions as in Example 1 except that no curable composition was added and only PDMS was used, and curing properties thereof were evaluated.

Comparative Example 2

A sample was prepared under the same conditions as in Example 1 except that only TTiP was used instead of the curable composition in Example 1, and curing properties thereof were evaluated.

Comparative Example 3

0.142 g of TTiP and 0.13 g of EAcAc were weighed and placed in a glass screw tube having a volume of 13.5 cc instead of those in Preparation Example 1, the tube was sealed, the content of the tube was mixed by a magnetic stirrer for 30 minutes, and thereafter a mixture of TTiP:EAcAc=1:2 (in molar ratio) was prepared. Other conditions were the same as those in Example 1 to prepare a sample, and curing properties of the sample were evaluated.

Comparative Example 4

A mixture of TTiP:AcAc=1:2 (in molar ratio) was prepared under the same conditions as in Comparative Example 3 except that 0.10 g of AcAc was used instead of 0.13 g of EAcAc, and curing properties thereof were evaluated.

Comparative Example 5

A mixture of TTiP:DM=1:2 (in molar ratio) was prepared under the same conditions as in Comparative Example 3 except that 0.132 g of DM was used instead of 0.13 g of EAcAc, and curing properties thereof were evaluated.

Comparative Example 6

A sample was prepared under the same conditions as in Example 1 except that only 0.0576 g of TMG was used instead of curable composition 1 used in Example 1, and curing properties thereof were evaluated.

Comparative Example 7

A sample was prepared under the same conditions as in Example 1 except that a mixture of 0.142 g of TTiP and 0.0576 g of TMG was used instead of curable composition 1 used in Example 1, and curing properties thereof were evaluated.

Comparative Example 8

A sample was prepared under the same conditions as in Example 1 except that 0.316 g of DBTDL was used instead of curable composition 1 used in Example 1, and curing properties thereof were evaluated.

TABLE 1

| Sample | Main agent PDMS (g) | Curable composition | | | | | | DBTDL (g) |
| --- | --- | --- | --- | --- | --- | --- | --- | --- |
| | | TTiP (g) | Chelating agent (g) | | | Guanidine compound (g) | | |
| | | | AcAc | EAcAc | DM | TMG | PhG | |
| Example 1 | 10 | 0.142 | — | 0.13 | — | 0.0576 | — | — |
| Example 2 | 10 | 0.142 | 0.10 | — | — | 0.0576 | — | — |
| Comp. example 1 | 10 | — | — | — | — | — | — | — |
| Comp. example 2 | 10 | 0.142 | — | — | — | — | — | — |
| Comp. example 3 | 10 | 0.142 | — | 0.13 | — | — | — | — |
| Comp. example 4 | 10 | 0.142 | 0.10 | — | — | — | — | — |
| Comp. example 5 | 10 | 0.142 | — | — | 0.132 | — | — | — |
| Comp. example 6 | 10 | — | — | — | — | 0.0576 | — | — |
| Comp. example 7 | 10 | 0.142 | — | — | — | 0.0576 | — | — |
| Comp. example 8 | 10 | — | — | — | — | — | — | 0.316 |

TABLE 2

| Sample | Mw | Mw/Mn | M |
| --- | --- | --- | --- |
| Example 1 | 40992 | 1.945 | 34648 |
| Example 2 | 30487 | 1.932 | 27389 |
| Comp. example 1 | 1499 | 1.757 | 1231 |
| Comp. example 2 | 1601 | 1.723 | 1300 |
| Comp. example 3 | 1648 | 1.629 | 1273 |
| Comp. example 4 | 1698 | 1.65 | 1340 |
| Comp. example 5 | 1645 | 1.742 | 1356 |
| Comp. example 6 | 2582 | 1.818 | 2335 |
| Comp. example 7 | 24007 | 1.725 | 24847 |
| Comp. example 8 | 46170 | 2.001 | 29103 |

Table 1 shows the formulation composition of each of the samples in Examples 1 and 2 and Comparative Examples 1 to 8. Table 2 and FIG. 1 show the molecular weight distribution measurement result of the product of each of the samples. In Table 2, Mw, Mn, and M represent the weight average molecular weight, the number average molecular weight, and the molecular weight on the top of the distribution curve, respectively.

In the samples in Examples 1 and 2 and Comparative Examples 7 and 8, a remarkable increase in molecular weight of PDMS was observed. Among them, the sample in Example 1 exhibited the highest peak value, and the increase in molecular weight thereof was observed to be comparable with that of the sample in Comparative Example 8 in which a tin type curing agent was used.

(2) Curing Test by Production of Siloxane Bond of PDMS Using Alkoxysilane as Crosslinking Agent Example 3

Curable composition 1 was provided in an amount of five times in advance in a glass screw tube having a volume of 13.5 cc in a glove box in which a dry nitrogen gas was purged. Thereafter, 1.65 g of curable composition 1 was prepared, and added to a solution of 50 g of PDMS and 6.811 g of MTMS in a glass flask having a volume of 300 cc. Then, this flask was covered with a glass lid equipped with four branches, and a mixed solution was stirred by a stirring rod under a dry nitrogen atmosphere at 40° C. for 24 hours. After the disappearance of the absorption peak of a Si—O—Ti bond was observed by FT-IR, the solution was spread on a tetrafluoroethylene petri dish having an inner diameter of 96 mm and a depth of 12 mm. The solution, after being spread on the petri dish, was left to stand under an atmosphere of a temperature of 25° C. and a humidity, RH, of 50%±10% for 7 days to provide a sheet-like cured body. A dumbbell sample was punched from the prepared sheet-like cured sample by using a die, and a precision universal tester (manufactured by Shimadzu Corporation, model number: AUTOGRAPH AGS-J) was used to perform a tensile test at a head speed of 500 mm/min according to JIS K6251.

Comparative Example 9

A sample was prepared under the same conditions as in Example 3 except that 0.711 g of TTiP was used instead of curable composition 1 in Example 3, and tensile properties of a cured body thereof were evaluated.

Comparative Example 10

A sample was prepared under the same conditions as in Example 3 except that 0.288 g of TMG was used instead of curable composition 1 in Example 3, and tensile properties of a cured body thereof were evaluated.

Comparative Example 11

A sample was prepared under the same conditions as in Example 3 except that the mixture prepared in Comparative Example 3 was used in an amount of five times, 1.362 g, instead of curable composition 1 in Example 3, and tensile properties of a cured body thereof were evaluated.

Comparative Example 12

A sample was prepared under the same conditions as in Example 3 except that 1.579 g of DBTDL was used instead of curable composition 1 in Example 3, and tensile properties of a cured body thereof were evaluated.

TABLE 3

| Sample | Main agent PDMS (g) | Crosslinking agent MTMS (g) | Curable composition | | | |
|---|---|---|---|---|---|---|
| | | | TTiP (g) | Chelating agent (g) EAcAc | Guanidine compound (g) TMG | DBTDL (g) |
| Example 3 | 50 | 6.811 | 0.711 | 0.651 | 0.288 | — |
| Comp. example 9 | 50 | 6.811 | 0.711 | — | — | — |
| Comp. example 10 | 50 | 6.811 | — | — | 0.288 | — |
| Comp. example 11 | 50 | 6.811 | 0.711 | 0.651 | — | — |
| Comp. example 12 | 50 | 6.811 | — | — | — | 1.579 |

Figure 2:
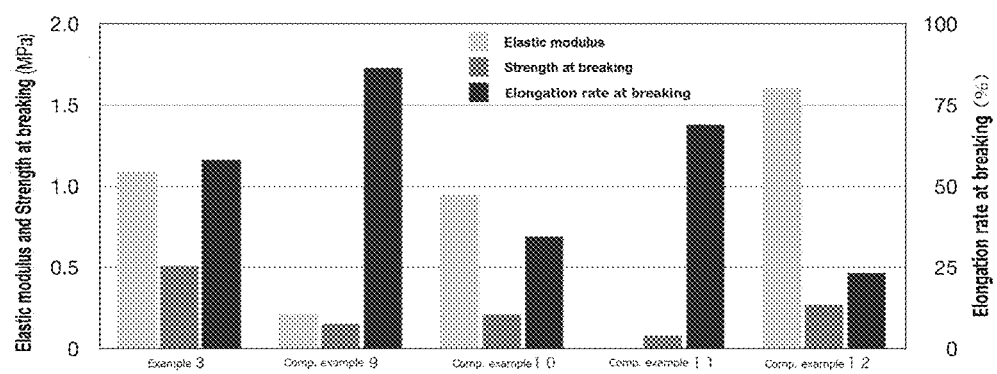
FIG. 2 shows tensile properties of each cured body prepared by using each sample shown in Table 3.

Table 3 shows the formulation composition of each of the samples in Example 3 and Comparative Examples 9 to 12. FIG. 2 shows tensile properties of each cured body prepared using each of the samples shown in Table 3. In FIG. 2, the respective bar graphs in the left, center and right with respect to each of the samples show the elastic modulus, the strength at breaking and the elongation rate at breaking, respectively.

The cured body in Example 3 had the highest strength at breaking, and was more flexible and had a higher elongation rate at breaking than the cured body in Comparative Example 12. While the cured body in Comparative Example 9 had the highest elongation rate at breaking, it was poor in strength at breaking as compared with the cured body in Example 3 and the cured body in Comparative Example 12. The cured body in Comparative Example 10 was poor in strength at breaking and was also low in elongation rate at breaking, as compared with the cured body in Example 3. The cured body in Comparative Example 11 was poorly cured to such an extent that the elastic modulus could not be measured. In addition, the cured body in Example 3 had a higher strength at breaking and a higher elongation rate at breaking than the cured body in Comparative Example 12. Thus, it is considered that the cured body using curable composition 1 is superior in curing properties to the cured body using a tin type curing agent.

Example 4

The hot water resistance test of the cured body prepared in Example 3 was performed. A test piece, obtained by cutting each cured body using a cutter to a shape of 1 cm in length, 1 cm in width and about 1.5 mm in thickness, was used. The cured body whose weight was measured was loaded together with about 30 g of pure water to a tetrafluoroethylene decomposition vessel (manufactured by As One Corporation) and left to stand in a constant temperature bath kept at 120° C. for 5 days, and thereafter the weight was measured. The weight was measured after the sample taken out was dried in a drying furnace kept at 50° C. for 2 hours, and the weight loss rate before and after this test was finally determined.

Comparative Example 13

The cured body prepared in Comparative Example 12 was subjected to the hot water resistance test by the same method as in Example 4.

Figure 3:
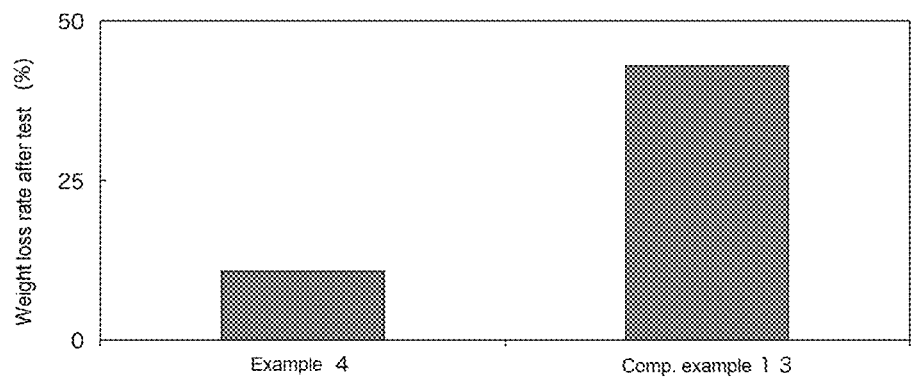
FIG. 3 shows the results in Example 4 and Comparative Example 13.

FIG. 3 shows the results in Example 4 and Comparative Example 13.

The weight loss rate in Example 4 was about one-quarter to that in Comparative Example 13. Thus, it is considered that the cured body using curable composition 1 is superior in hot water resistance to the cured body using a tin type curing agent.

(3) Curing Test by Production of Siloxane Bond of Crosslinkable Silyl Group-Containing Polymer Having Polyether or Acrylic Polymer as Main Chain Example 5

In a glove box in which a dry nitrogen gas was purged, 40 g of an alkoxysilyl group-containing acrylic polymer (produced by Toagosei Co., Ltd., product number: ARUFON US-6170) and 1.82 g of curable composition 1 were loaded to a high-density polyethylene vessel (volume: 300 cc), the vessel was sealed, and the content thereof was stirred at 2000 rpm for 5 minutes and defoamed at 1500 rpm for 2 minutes by a planetary mixing/stirring apparatus (manufactured by Thinky, model number: ARE-250T). After left to still stand at room temperature for 30 minutes, 15 g of the mixture was spread on a tetrafluoroethylene petri dish having an inner diameter of 96 mm and a depth of 12 mm, and after a lapse of a certain period of time, viscosity measurement was performed. RE-85R (manufactured by Toki Sangyo Co., Ltd.) was used for the viscosity measurement. In order to maintain the measurement temperature of an object to be measured at 30° C., warm water at 30° C. was circulated in a measuring object holder via a pump. Calibration was performed using silicone oil specified in JIS.

Example 5a

The same test was performed under the same conditions as in Example 5 except that 1.65 g of curable composition 2 was loaded instead of curable composition 1 in Example 5.

Example 5b

The same test was performed under the same conditions as in Example 5 except that 0.37 g of PhG was loaded instead of TMG in curable composition 1 in Example 5.

Example 5c

The same test was performed under the same conditions as in Example 5 except that 0.72 g of DM was loaded instead of EAcAc in curable composition 1 in Example 5.

Comparative Example 14

The same test was performed as in Example 5 except that curable composition 1 in Example 5 was replaced by 1.50 g of the mixture prepared by the method described in Comparative Example 3.

Comparative Example 15

The same test was performed as in Example 5 except that curable composition 1 in Example 5 was replaced by 0.32 g of TMG.

Comparative Example 16

The same test was performed as in Example 5 except that curable composition 1 in Example 5 was replaced by 1.74 g of DBTDL.

TABLE 4

| Sample | Main agent US-6170 (g) | Curable composition | | | | | | | Initial viscosity (Pa·s) |
| --- | --- | --- | --- | --- | --- | --- | --- | --- | --- |
| | | TTiP (g) | Chelating agent (g) | | | Guanidine compound (g) | | DBTDL (g) | |
| | | | EAcAc | AcAc | DM | TMG | PhG | | |
| Example 5 | 40 | 0.78 | 0.72 | — | — | 0.32 | — | — | 3316 |
| Example 5a | 40 | 0.78 | — | 0.55 | — | 0.32 | — | — | 3204 |
| Example 5b | 40 | 0.78 | 0.72 | — | — | — | 0.37 | — | 3910 |
| Example 5c | 40 | 0.78 | — | — | 0.72 | 0.32 | — | — | 3068 |
| Comp. example 14 | 40 | 0.78 | 0.72 | — | — | — | — | — | 3512 |
| Comp. example 15 | 40 | — | — | — | — | 0.32 | — | — | 4347 |
| Comp. example 16 | 40 | — | — | — | — | — | — | 1.74 | 3745 |

Figure 4:
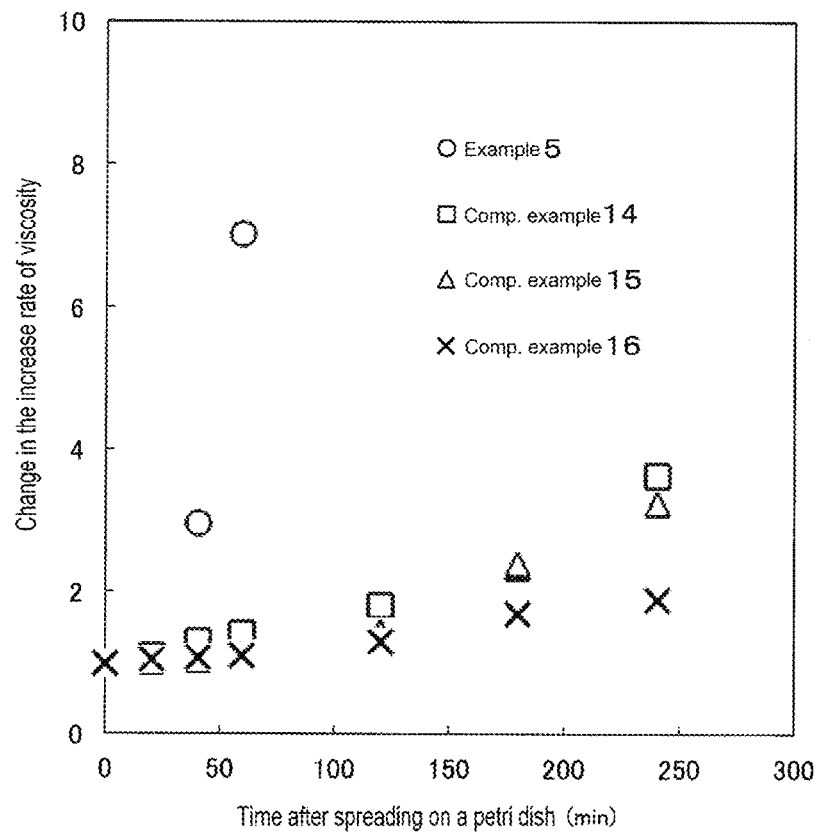
FIG. 4 shows the change in viscosity (change in increase rate of viscosity) over time after each of samples in Example 5 and Comparative Examples 14 to 16 shown in Table 4 is spread on a petri dish.
Figure 5:
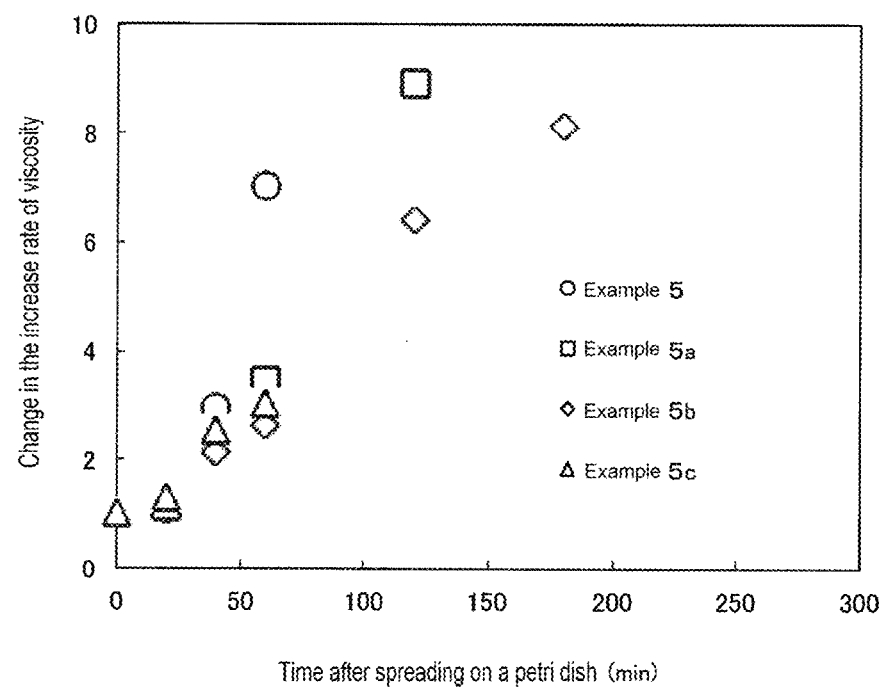
FIG. 5 shows the change in viscosity (change in increase rate of viscosity) over time after each of samples in Examples 5, 5a, 5b and 5c shown in Table 4 is spread on a petri dish.

Table 4 shows the formulation composition and the initial viscosity after spreading on a petri dish, of each of the samples in Examples 5, 5a, 5b and 5c and Comparative Examples 14 to 16. FIG. 4 shows the change in viscosity (change in the increase rate of viscosity) over time after each of the samples in Example 5 and Comparative Examples 14 to 16 shown in Table 4 was spread on a petri dish. FIG. 5 shows the change in viscosity (change in the increase rate of viscosity) over time after each of the samples in Examples 5, 5a, 5b and 5c shown in Table 4 was spread on a petri dish.

As shown in FIG. 4, the sample in Example 5 had a rapidly increased viscosity after being spread on a petri dish as compared with each of the samples in Comparative Examples 14 to 16. In addition, as shown in FIG. 5, the comparison among the respective samples in Examples 5, 5a, 5b and 5c indicated that the sample in Example 5 had a relatively high increase speed of viscosity after being spread on a petri dish, as compared with each of the samples in Examples 5a, 5b and 5c. From these results, it is considered that the curable composition including TTiP, a chelating agent and a guanidine compound type mixture exhibits superior curing properties to the mixture of only a tin type curing agent, TTiP and a chelating agent, and only a guanidine compound, and among them, curable composition 1 using EAcAc as a chelating agent and TMG as a guanidine compound can exhibit further excellent curing properties.

Example 6

In a glove box in which a dry nitrogen gas was purged, 50 g of silyl-terminated polyether (produced by Kaneka Corporation, product number: S303) and 3.83 g of curable composition 3 were loaded to a high-density polyethylene vessel (volume: 300 cc), the vessel was sealed, and the content thereof was stirred at 2000 rpm for 5 minutes and defoamed at 1500 rpm for 2 minutes by a planetary mixing/stirring apparatus (manufactured by Thinky, model number: ARE-250T). After this mixture sample was left to still stand in room at 25° C. for 30 minutes, the following tests were performed.

(1) Evaluation of Skinning Time

A mixture sample prepared under an atmosphere of 25° C.±2° C. and a relative humidity of 50±5% was filled in a plastic vessel having an inner diameter of 30 mm and a depth of 6 mm, and left to still stand. A time until a cured film skinned on the surface, even if touched by fingers, was not transferred and stuck to fingers was measured, defined as the skinning time, and defined as an index of curability. A shorter skinning time means that curability is superior.

(2) Adhesion Strength Test

The mixture prepared was applied to an aluminum plate, and another aluminum plate was immediately pasted thereto with a spacer having a thickness of 0.2 mm interposed therebetween. The adhesion area was 2 cm×2 cm. Pasting was performed by using a clip under an atmosphere of a temperature of 25° C. and a relative humidity of 50% for 24 hours, and thereafter the adhesion strength was measured according to JIS K 6850 (tensile shear adhesion strength test method of rigid adhered).

Example 7

The test was performed in the same manner as in Example 6 except that 3.09 g of curable composition 1 was used instead of curable composition 3 in Example 6.

Comparative Example 17

The test was performed in the same manner as in Example 6 except that 1.33 g of TTiP and 1.22 g of EAcAc were used instead of curable composition 3 in Example 6.

Comparative Example 18

The test was performed in the same manner as in Example 6 except that 0.64 g of PhG was used instead of curable composition 3 in Example 6.

Comparative Example 19

The test was performed in the same manner as in Example 6 except that 3.0 g of DBTDL was used instead of curable composition 3 in Example 6.

Comparative Example 20

The test was performed in the same manner as in Example 6 except that 3.0 g of DBTDL and 3.0 g of aminosilane were used instead of curable composition 3 in Example 6.

TABLE 5

| Sample | Main agent S303 (g) | Curable composition | | | | DBTDL (g) | Aminosilane (g) |
| --- | --- | --- | --- | --- | --- | --- | --- |
| | | TTiP (g) | Chelating agent (g) EAcAc (g) | Guanidine compound (g) | | | |
| | | | | TMG | PhG | | |
| Example 6 | 50 | 1.33 | 1.22 | — | 1.26 | — | — |
| Example 7 | 50 | 1.33 | 1.22 | 0.54 | — | — | — |
| Comp. example 17 | 50 | 1.33 | 1.22 | — | — | — | — |
| Comp. example 18 | 50 | — | — | — | 0.64 | — | — |
| Comp. example 19 | 50 | — | — | — | — | 3.0 | — |
| Comp. example 20 | 50 | — | — | — | — | 3.0 | 3.0 |

TABLE 6

| Sample | Skinning time (min) | Tensile shear adhesion strength (MPa) |
| --- | --- | --- |
| Example 6 | 9 | 0.78 |
| Example 7 | 15 | 0.49 |
| Comp. example 17 | 24 | 0.36 |
| Comp. example 18 | >60 | unevaluable |
| Comp. example 19 | >60 | unevaluable |
| Comp. example 20 | 16 | 0.33 |

Table 5 shows the formulation composition of each of the samples in Examples 6 and 7 and Comparative Examples 17 to 20. Table 6 shows the skinning time and the tensile shear adhesion strength of each of the samples shown in Table 5. "Unevaluable" in Table 6 means that the sample was not sufficiently cured even at 24 hours after being left to still stand, and thus could not be subjected to evaluation.

As shown in Table 6, both of the samples prepared in Example 6 and Example 7 had a short skinning time, and the cured bodies thereof had a higher tensile shear adhesion strength than each cured body of the samples prepared in Comparative Examples. It has been found from this result that the curable composition, in which TTiP and EAcAc, and TMG or PhG are added, exhibits a higher curing rate of and adhesion strength to the silyl-terminated polyether than the curable composition in which a tin type curing agent and additionally an aminosilane coupling agent are added, the curable composition in which only TTiP and a chelating agent are added, and the curable composition including only a guanidine compound.

(4) Curing Test by Production of Urethane Bond Due to Reaction of Polyol and Polyisocyanate

Example 8

45.3 g of PPG and about 0.036 g of curable composition 1 were taken, and mixed using a magnetic stirrer in a polyethylene cup, and 16.0 g of DIC was further added thereto and mixed using a plastic spatula. Such operations were performed in a glove box in which a dry nitrogen gas was purged. After defoaming in vacuum, 15 g of the mixture prepared was spread on a fluororesin petri dish having an inner diameter of 96 mm and a depth of 12 mm, and after a lapse of a certain period of time, viscosity measurement was performed. The viscosity measurement was performed by the same method as in Example 5.

Example 9

A mixture, prepared with curable composition 1 in Example 8 in an amount formulated of 0.5 times, was subjected to the viscosity measurement by the same method as in Example 8.

Comparative Example 21

A mixture was prepared and the viscosity thereof was measured under the same conditions as in Example 8 except that curable composition 1 in Example 8 was replaced by 0.0155 g of TTiP.

Comparative Example 22

A mixture was prepared and the viscosity thereof was measured under the same conditions as in Example 8 except that curable composition 1 in Example 8 was replaced by 0.0360 g of TMG.

Comparative Example 23

A mixture was prepared and the viscosity thereof was measured under the same conditions as in Example 8 except that curable composition 1 in Example 8 was replaced by 0.026 g of TC-750.

Comparative Example 24

A mixture was prepared and the viscosity thereof was measured under the same conditions as in Example 8 except that curable composition 1 in Example 8 was replaced by 0.036 g of DBTDL.

TABLE 7

| Sample | Main agent PPG (g) | Main agent DIC (g) | Curable composition TTiP (g) | Curable composition Chelating agent (g) EAcAc | Curable composition Guanidine compound (g) TMG | TC-750 (g) | DBTDL (g) |
|---|---|---|---|---|---|---|---|
| Example 8 | 45.3 | 16.0 | 0.0155 | 0.0142 | 0.0063 | — | — |
| Example 9 | 45.3 | 16.0 | 0.0078 | 0.0071 | 0.0032 | — | — |
| Comp. example 21 | 45.3 | 16.0 | 0.0155 | — | — | — | — |
| Comp. example 22 | 45.3 | 16.0 | — | — | 0.0360 | — | — |
| Comp. example 23 | 45.3 | 16.0 | — | — | — | 0.026 | — |
| Comp. example 24 | 45.3 | 16.0 | — | — | — | — | 0.036 |

Figure 6:
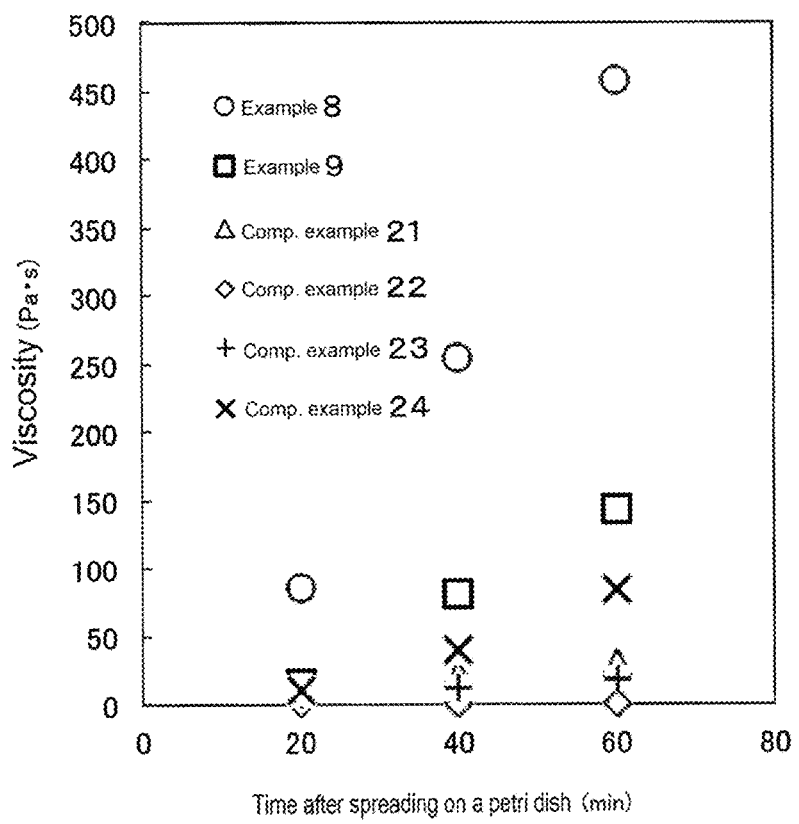
FIG. 6 shows the change in viscosity over time after each sample shown in Table 7 is spread on a petri dish.

Table 7 shows the formulation composition of each of the samples in Examples 8 and 9 and Comparative Examples 21 to 24. FIG. 6 shows the change in viscosity over time after each of the samples shown in Table 7 was spread on a petri dish.

At 60 minutes after each of the samples was spread on a petri dish, the sample in Example 8 exhibited an increased viscosity about five times that of the sample in Comparative Example 24 in which a tin type curing agent was used. In addition, the sample in Example 9, in which the amount of curable composition 1 formulated was 0.5 times that in Example 8, also exhibited an increased viscosity as compared with the sample in Comparative Example 24. On the other hand, each of the samples in Comparative Examples 21, 22 and 23 exhibited an increased viscosity in an extremely small manner. In particular, the sample in Comparative Example 22, in which only TMG was added, hardly exhibited an increased viscosity during the test period of time.

INDUSTRIAL APPLICABILITY

The present invention can be utilized as a curable catalyst for a resin or as a resin excellent in curing properties.

The invention claimed is:

1. A cured synthetic resin obtained by curing a composition comprising a polyol and a polyisocyanate in the presence of a catalyst composition including:
   (A) a titanium alkoxide,
   (B) a bidentate organic chelating agent for stabilizing the titanium alkoxide, and
   (C) a guanidine compound;
   wherein the composition comprises the titanium alkoxide (A), the bidentate organic chelating agent (B) and the guanidine compound (C) in a molar ratio of 1:0.5 to 3:0.5 to 2.

2. The cured synthetic resin according to claim 1, wherein the bidentate organic chelating agent (B) is at least one of ethyl acetoacetate and acetylacetone, and the guanidine compound (C) is at least one of 1-phenylguanidine and 1,1,3,3-tetramethylguanidine.

3. A composition, comprising:
   (A) a titanium alkoxide,
   (B) a bidentate organic chelating agent for stabilizing the titanium alkoxide,
   (C) a guanidine compound,
   (D) a polyol, and
   (E) a polyisocyanate,
   wherein the composition comprises the titanium alkoxide (A), the bidentate organic chelating agent (B) and the guanidine compound (C) in a molar ratio of 1:0.5 to 3:0.5 to 2.

4. The composition according to claim 3, wherein the bidentate organic chelating agent (B) is at least one of ethyl acetoacetate and acetylacetone, and the guanidine compound (C) is at least one of 1-phenylguanidine and 1,1,3,3-tetramethylguanidine.

* * * * *